United States Patent [19]
Brandenstein et al.

[11] 3,871,724
[45] Mar. 18, 1975

[54] CLUTCH BEARINGS

[75] Inventors: Manfred Brandenstein, Aschfeld; Armin Olschewski, Schweinfurt, both of Germany

[73] Assignee: SKF Industrial Trading and Development Company B.V., Amsterdam, Netherlands

[22] Filed: Mar. 30, 1973

[21] Appl. No.: 346,581

[30] Foreign Application Priority Data
Apr. 13, 1972 Germany.......................... 7213788

[52] U.S. Cl................... 308/233, 308/191, 308/195
[51] Int. Cl. ............................................. F16c 19/04
[58] Field of Search..................... 308/191, 195, 233

[56] References Cited
UNITED STATES PATENTS

| | | | |
|---|---|---|---|
| 494,384 | 3/1893 | Pettit | 308/191 |
| 886,949 | 5/1908 | Cornforth | 308/195 |
| 2,038,293 | 4/1936 | Jacobs | 308/191 |

FOREIGN PATENTS OR APPLICATIONS

| | | | |
|---|---|---|---|
| 1,224,300 | 3/1971 | Great Britain | 308/191 |

*Primary Examiner*—Lloyd L. King
*Assistant Examiner*—Richard A. Bertsch
*Attorney, Agent, or Firm*—Murray Schaffer

[57] ABSTRACT

A clutch bearing in which a bowl shaped outer ring having a central bore, and a bowl shaped inner ring having a cylindrically shaped central portion extending within the central bore are assembled within each other and have a plurality of bearing elements located between them. A sleeve is located about the cylindrical portion of the inner ring. The sleeve has a free end extending radially outward over the edge of the bore of the outer ring to hold the inner and outer rings together.

6 Claims, 2 Drawing Figures

PATENTED MAR 18 1975　　3,871,724

3,871,724

CLUTCH BEARINGS

BACKGROUND OF INVENTION

The present invention relates to a roller bearing and in particular to a clutch bearing made from the sheet metal.

A common form of clutch bearing for the shift mechanism of a transmission comprises a bowl shaped outer ring having a central bore and a similarly shaped inner ring which is provided with a cylindrical central portion extending into the central bore of the outer ring. A plurality of bearing elements such as balls are held in a cage arranged between the inner and outer ring. Such clutch bearings, mostly formed with inclined race surfaces have the disadvantage that because of the compression angle and the shape of the race surfaces, the outer ring can easily come apart from the bearing itself and may be readily lost during transport or during installation of the bearing in the transmission.

It is the object of the present invention to provide a clutch bearing, particularly a bearing for the clutch shift mechanism formed of sheet metal which has its inner and outer ring held together with the roller elements and the cage arranged therebetween in a non-detachable unitary assembly.

The objects and advantages of the present invention are described in connection with a description of its preferred embodiment as set forth herein.

SUMMARY OF INVENTION

Briefly, the objects of the present invention are obtained by providing a clutch bearing formed from sheet metal in which the cylindrical portion of the inner ring is provided with an elongated shell which extends over the free edge of the central bore of the outer ring and thereby prevents the inner and outer rings from axially coming apart.

According to the present invention, a clutch bearing is provided comprising a bowl shaped outer ring having a central bore, and a bowl shaped inner ring having a cylindrical central portion extending within the central bore. A plurality of balls are located between the inner and outer rings. An elongated sleeve is secured about the cylindrical portion of the inner ring and is provided with a free end which is bent to extend radially over the edge of the bore of the outer ring to thereby hold the inner and outer rings together against axial displacement.

Preferably, according to the present invention, the sleeve is press fit over the cylindrical portion of the inner ring so that while it is normally not detachable it may be easily removed in order to separate the parts of the bearing for replacement of the ball elements or the like. A further advantage is obtained by the present invention in not only holding the inner and outer rings together but by the fact that the sleeve forms a sealed chamber in which lubricant may be retained. A further advantage arises from the fact that the sleeve is extremely simple and is both economical of cost and economical the space it employs in order to hold the two parts of the bearing together.

Full details of the present invention are given in the following description and are shown in the attached drawing.

DESCRIPTION OF INVENTION

Figure 1:
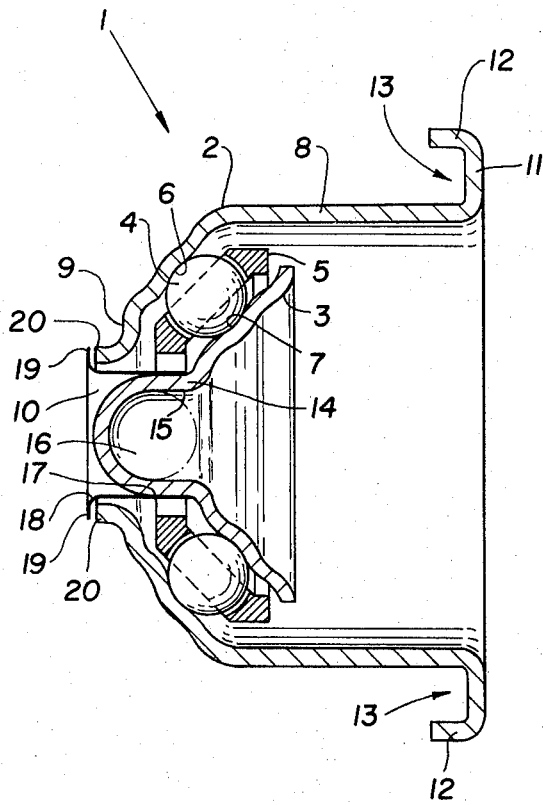
FIG. 1 is an axial section through a clutch bearing formed in accordance with the present invention.

As is seen in FIG. 1 the bearing 1 of the present invention comprises an outer ring 2 formed of a unitary piece of sheet metal and a similarly formed inner ring 3 between which a plurality of balls 4 are arranged. The balls 4 are held in a cage 5 and are driven over inclined race surfaces 6 and 7 respectively on the outer and inner rings.

Figure 2:
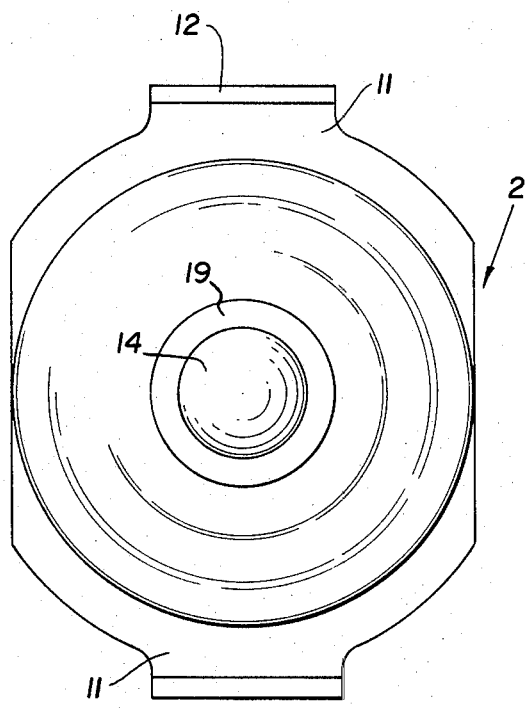
FIG. 2 is a top plan view showing the bearing of FIG. 1.

The outer race ring has a radially outer cylindrical shell 8 which extends coaxially about the central axis of rotation of the bearing and a radially inner bottom portion 9 which forms the central bore 10 of the bearing. The shell 8, by which the bearing is adapted to be centered in a bore (not shown) of the transmission unit is formed with two lobes 11 extending integrally from it in diagonally opposite directions as is seen in FIG. 2. The edges 12 of the lobes 11 are bent over in a reentrant angle, in the bight 13 of which the operating element of the clutch is adapted to be received. The operating element of the clutch is for example the disengaging fork lever, the forks of which are respectively secured within the bights 13. The U-shaped lobes hold the operating element securely and has the advantage that a high degree of fastenability is provided by a very simple expedient.

The inner ring 3 of the bearing is also shaped like a bowl to conform to the race surface of the outer ring. The inner ring 3 is provided with a cylindrical neck 14 having a dome shaped head. The cylindrical neck 14 provides a bore 15 in which one of the clutch directional operating mechanisms such as a bar or ball 16 is engaged. The outer surface 17 of the cylindrical neck 14 is provided with an elongated sleeve 18. The sleeve is preferably press fit over the surface 17. However, it may be secured to the surface 17 in any other suitable and conventional manner. The sleeve sits along the neck 14 and abuts against the flared portion of the inner race ring 3. The free end of the sleeve 18 extends outwardly beyond the domed head of the neck 14 and is bent over to form a radially outward flange 18 which engages over the edge 20 of the radially inner edge portion 9 of the outer race ring and covers the bore 10 formed by it. The radially outwardly directed flange 19 of the sleeve 18 prevents the inner and outer race rings from moving axially with respect to each other and thereby prevents the race rings from coming apart. The sleeve 18 may also be formed of sheet metal or of any other similar tubing stock and has a length sufficient only to grasp about the neck 14 and extend over the outer race ring 2 as is shown. In this way a simple non-detachable unitary assembly of inner and outer race rings is formed which does not require any greater space than is normally necessary for the construction of the bearing itself.

Further, the sleeve 18 and its radially extending flange 19 enclose the bore 10 of the bearing and thus form a chamber wherein lubricant may be retained.

In the plan view of FIG. 2 the clutch shift bearing of FIG. 1 is clearly shown. The relationship of the free radially outwardly extending flange 19 of the sleeve 18 as it sits about the cylindrical neck 14 and the outer sleeve 2 is clearly depicted. The lobes 11 and the U-shaped edges 12 which receive the forked end of the lever are also clearly shown.

From the foregoing it will be clear that the present invention provides a clutch coupling in the form of a unitary non-detachable assembly which is both simple and economical to manufacture. The additional retaining sleeve 18 adds very little cost to the bearing and its advantages far outweigh any additional cost that may actually occur. By press fitting the sleeve 18 about the neck 14 the sleeve itself may be removed in order to repair or replace any part of the bearing and thus the length of life of the sleeve is found to be greater than those of the known prior art.

Various modifications and changes will present themselves to those skilled in the present art. The present disclosure and the drawings are intended to be illustrative of the present invention and not to be limiting of its scope.

What is claimed:

1. A clutch bearing comprising a sheet metal bowl shaped outer ring having a central bore, a sheet metal bowl shaped inner ring having a cylindrically shaped central portion extending within said central bore and a plurality of ball bearing elements located between said inner and outer rings, said outer ring being cylindrically extended to form a sleeve adapted to seat within a conforming bore, and having means extending radially outward therefrom to receive an operating lever, whereby said outer ring may be axial and radially moved relative to said inner ring, a cylindrical sleeve located within the central bore of the outer ring about the extending cylindrical portion of the inner ring, said sleeve being secured to said central portion and having a free end extending radially outward over the edge of the bore of the outer ring to hold said inner and outer rings together.

2. The clutch bearing according to claim 1 wherein said sleeve is force fit about said cylindrical central portion.

3. The clutch bearing according to claim 1 wherein said ball bearing elements are held in a cage and run against inclined race surfaces.

4. The clutch bearing according to claim 1 wherein said outer race ring has a radially outer elongated shell adapted to seat within a cylindrical bore, said shell being provided with diametrically opposed lobes, said lobes being bent into a U-shape and adapted to receive the ends of an operating lever.

5. The clutch bearing according to claim 1 wherein the radially extending free edge of the sleeve encloses the central bore of the bearing and forms a lubricant chamber.

6. The clutch bearing according to claim 1, wherein said cylindrical sleeve is separable from said inner and outer rings.

* * * * *